(12) United States Patent
Arnold (10) Patent No.: US 9,284,699 B1
(45) Date of Patent: Mar. 15, 2016

(54) MULTI-MODE TAPE-APPLYING STRIPING MACHINE AND METHODS

(71) Applicant: Ralph Arnold, West Jordan, UT (US)

(72) Inventor: Ralph Arnold, West Jordan, UT (US)

(*) Notice: Subject to any disclaimer, the term of this patent is extended or adjusted under 35 U.S.C. 154(b) by 45 days.

(21) Appl. No.: 14/121,695

(22) Filed: Oct. 8, 2014

Related U.S. Application Data (63) Continuation of application No. 13/573,180, filed on Aug. 28, 2012, now abandoned.

(51) Int. Cl.
| | |
|---|---|
| *E01C 23/00* | (2006.01) |
| *E01C 23/18* | (2006.01) |
| *E01C 23/16* | (2006.01) |
| *B29L 31/00* | (2006.01) |

(52) U.S. Cl.
CPC .............. *E01C 23/185* (2013.01); *E01C 23/16* (2013.01); *B29L 2031/723* (2013.01)

(58) Field of Classification Search
CPC .. E01C 23/16; E01C 23/185; B29L 2031/723
USPC .......................................................... 404/94
See application file for complete search history.

(56) References Cited

U.S. PATENT DOCUMENTS

| | | | |
|---|---|---|---|
| 2,192,290 A | 3/1940 | O'Neal ........................... 156/390 |
| 2,546,308 A | 3/1951 | Kahler ............................ 156/575 |
| 3,393,114 A | 7/1968 | Jorgensen ...................... 156/523 |
| 3,483,064 A | 12/1969 | Coats, Jr. et al. .............. 156/577 |
| 3,717,540 A | 2/1973 | Henc .............................. 156/577 |
| 3,886,011 A | 5/1975 | Eigenmann ....................... 156/71 |
| 4,030,958 A * | 6/1977 | Stenemann ............ E01C 23/185 156/350 |
| 4,102,718 A * | 7/1978 | Eigenmann .............. E01F 9/083 156/291 |
| 4,162,862 A | 7/1979 | Harker et al. .................... 404/72 |
| 4,242,173 A * | 12/1980 | Stenemann ............ E01C 23/185 156/523 |
| 4,313,780 A | 2/1982 | Ford, Jr. ......................... 156/523 |
| 4,623,280 A | 11/1986 | Stenemann ....................... 404/94 |
| 4,624,602 A | 11/1986 | Kieffer et al. .................... 404/94 |
| 4,824,516 A * | 4/1989 | Ishihara ................. B26D 1/205 156/523 |
| 4,923,559 A * | 5/1990 | Kennedy ............... E01C 23/185 156/523 |
| 5,439,540 A | 8/1995 | Lippman et al. ................. 156/71 |
| 5,718,534 A | 2/1998 | Neuling ........................... 404/94 |
| 5,772,359 A * | 6/1998 | Marty ................... E01C 23/185 156/577 |
| 5,785,453 A | 7/1998 | Marty et al. ..................... 404/94 |
| 6,413,013 B1 | 7/2002 | Requena ........................... 404/94 |
| 6,547,158 B1 | 4/2003 | Smith ............................. 239/150 |
| 7,763,136 B2 | 7/2010 | Richards et al. ................ 156/71 |
| 2010/0072717 A1 | 3/2010 | Liska ........................ 280/47.371 |
| 2011/0229265 A1* | 9/2011 | Schottka ............... E01C 23/185 404/94 |
| 2014/0064849 A1* | 3/2014 | Arnold .................. E01C 23/185 404/75 |

* cited by examiner

*Primary Examiner* — Raymond W Addie
(74) *Attorney, Agent, or Firm* — Lynn G. Foster (57) ABSTRACT

A tape-applying striper, and related methods, by which commercially-available pavement marking tape is mechanically-applied and pressure-retained on highways, roadways and parking lots to mark lanes and parking stalls at designated locations, wherein the striper is dirigible either by the operator walking behind the striper and manually displacing the striper, or by motor driving the dirigible striper, as the operator rides.

13 Claims, 6 Drawing Sheets

MULTI-MODE TAPE-APPLYING STRIPING MACHINE AND METHODS

CONTINUITY

This application is a continuation of U.S. patent application Ser. No. 13/573,180, filed Aug. 28, 2012 now abandoned.

FIELD OF THE INVENTION

The present invention relates generally to machines by which tape is applied to pavement to mark lanes on highways and roadways and also to mark parking stalls and, more particularly, to stripers, and related methods, where the tape is mechanically caused to adhere and be pressure-retained in accurate positions and wherein the operator may either walking behind and manually steer the striper, usually in smaller localized areas, or the striper may be motor-driven, usually for longer distances, including, but not limited to, use of a separate but drive-connected motorized vehicle, on which the operator rides, the vehicle including a steering mechanism, which accurately displaces the striper and accurately and securely causes the striper to apply the tape to the pavement in desired locations linearly or curvilinearly, at surprisingly rapid speeds.

BACKGROUND

In lieu of striping pavement with painted lines, such striping is also advantageously done using rolls of tape applied selectively to pavement locations to create lines on highways, roadways and parking lots. In most ways, use of paint and tape involves different technologies.

Striping with tape, in the past, has relied solely on the glue or bonding agent on the underside of the tape to secure the tape to the pavement.

Also, prior art tape-applying stripers have mandated the operator walk behind the machine, independent of whether the machine is manually displaced or self-propelled. In both cases, taping is slow, rest times for the operator are frequent, and errors often occur, especially as fatigue negatively affects the operator, when, for example, the pavement has a significant slope and/or covers long distances over a protracted interval of time.

BRIEF SUMMARY AND OBJECTS OF THE INVENTION

In brief summary, the present invention comprises tape-applying stripers, and related methods, by which commercially available pavement marking tape is mechanically-applied and pressure-retained on highways, roadways and parking lots to mark lanes and parking stalls at designated locations, linearly and curvilinearly, wherein the stripers are dirigible either by the operator walking behind the striper, and manually displacing the striper, usually in small areas, or by motor-driving the dirigible striper with a vehicle, as the operator rides, typically for longer distances.

With the foregoing in mind, it is a primary object of the present invention to provide novel tape-applying striping machines, and related methods.

Another dominate object is the provision of novel stripers, and methods, for mechanically-applying and pressure-retaining a marking tape on pavement, at designated locations.

A further paramount object is the provision of novel and versatile tape-applying stripers, and related methods, which selectively accommodate both facile manual use and rapid motorized vehicle use controlled by an operator riding on the vehicle.

An additional object is provision of novel tape-applying stripers, and related methods, wherein the affect of human fatigue is greatly negated, accuracy is increased and the speed of accurate tape deposition is substantially increased.

Further objects include a novel tape-cutting feature, a novel tape-applying feature and a novel wheel control feature.

These and other objects and features of the present invention will be apparent from the following detailed description taken with reference to the accompanying drawings.

DETAILED DESCRIPTION OF THE ILLUSTRATED EMBODIMENTS

In detail, as set forth more extensively hereinafter, this specification is directed to tape-applying stripers by which tape is accurately applied to pavement to mark lanes on highways and roadways and also to mark parking stalls. The tape, at the leading end, is mechanically caused to engage and adhere and, thereafter, the tape is pressure-retained in accurate positions on the top surface of the pavement. The operator may either walk behind the striper and manually steer the striper, typically where markings are being placed on smaller localized areas, such as to mark stalls on parking lots. The striper is most often motor-driven, where longer distances are involved, using a separate motorized vehicle which is rotatably connected to the rear of the striper and on which the operator sits to control both the vehicle and the striper, resulting in accurate and extraordinarily rapid placement of marking tape on the pavement.

The vehicle may comprise a commercially available vehicle comprising a motor, a steering mechanism, a brake system and a drive mechanism for selectively displacing the vehicle in forward and reverse directions. LINEDRIVER by Graco is a suitable vehicle, although other commercially available vehicles may be used. The striper progressively applies one or two lengths of tape to pavement at a rapid speeds up to 15 miles per hour (300 feet in 30 seconds), on straight-a-ways. The striper is equally accurate and effective in placing tape in a curvilinear pattern, as it is placing tape in a linear pattern. With the operator riding on the vehicle, the negative effects of fatigue are neutralized and, accordingly, accuracy is maintained as the tape is applied rapidly. The striper comprises a front wheel control feature, herein described in greater detail, accommodating both curvilinear displacement and linear displacement, where operator involvement is minimized.

The striper comprises a carriage mounted on pavement-engaging wheels. The carriage rotatably supports a spool on which one or two rolls of tape are mounted for rotatable dispensing of the tape, from a tape roll, through a tape feed path in the striper to the pavement, so that the adhesive side of the tape is progressively and accurately superimposed upon the pavement, as the striper is displaced.

Two spaced pressure-applying rollers, mounted to the carriage, are disclosed, by which force (pressure) is selectively and contiguously applied to the non-adhesive top side of the tape, after it has been initially superimposed upon the pavement, to insure reliable and strong adherence of the tape to the pavement. The striper is equipped with an operator control by which linkage and tape displacement fingers, flaps or paddles engage in a limited way the adhesive side of a free end of the tape, above the pavement, after the tape has been cut or when initial tape placement occurs. The fingers have limited contact with tape and move the tape generally downward, causing the free leading end to adheringly and accurately engage the pavement. After which the fingers are lifted and the limited adherence of the fingers is negated.

The operator is provided with an actuator by which the tape may be mechanically cut at desired locations to accommodate, in effect, placement of a segmented, dotted or broken line of tape, by which drivers are informed that lane changes are permitted. In some settings, where two rolls of tape are being simultaneously used, both may be continuously applied to the pavement in side-by-side relation, without cutting, or both may be applied in segments, utilizing the cutting mechanism, or one may be continuously applied and the other tape cut into segments, depending on the roadway specification.

The cutting blade is mounted to the carriage in such a way that it can be linearly reciprocated, when both lengths of tape are to be cut. In the alternative, cutting blade may be advanced pivotably from one edge or the other to cut only one or the other of the two tapes being dispensed and placed upon the pavement. Tape cutting is controlled by the operator in compliance with the roadway specification.

The wheels upon which the striper is mounted comprise a single front central wheel, which is associated with a latch mechanism by which the front wheel can either be locked in a single position for linear displacement of the striper or unlocked so that the front wheel, the carriage and the striper track along a curvilinear path, where the roadway specification requires. Thus, the striper is dirigible, under the control of the operator, who rides on the vehicle.

Adherence of the tape to the pavement is substantially enhanced by utilization of two spaced compression rollers, each carried by the carriage at separate locations.

Figure 1:
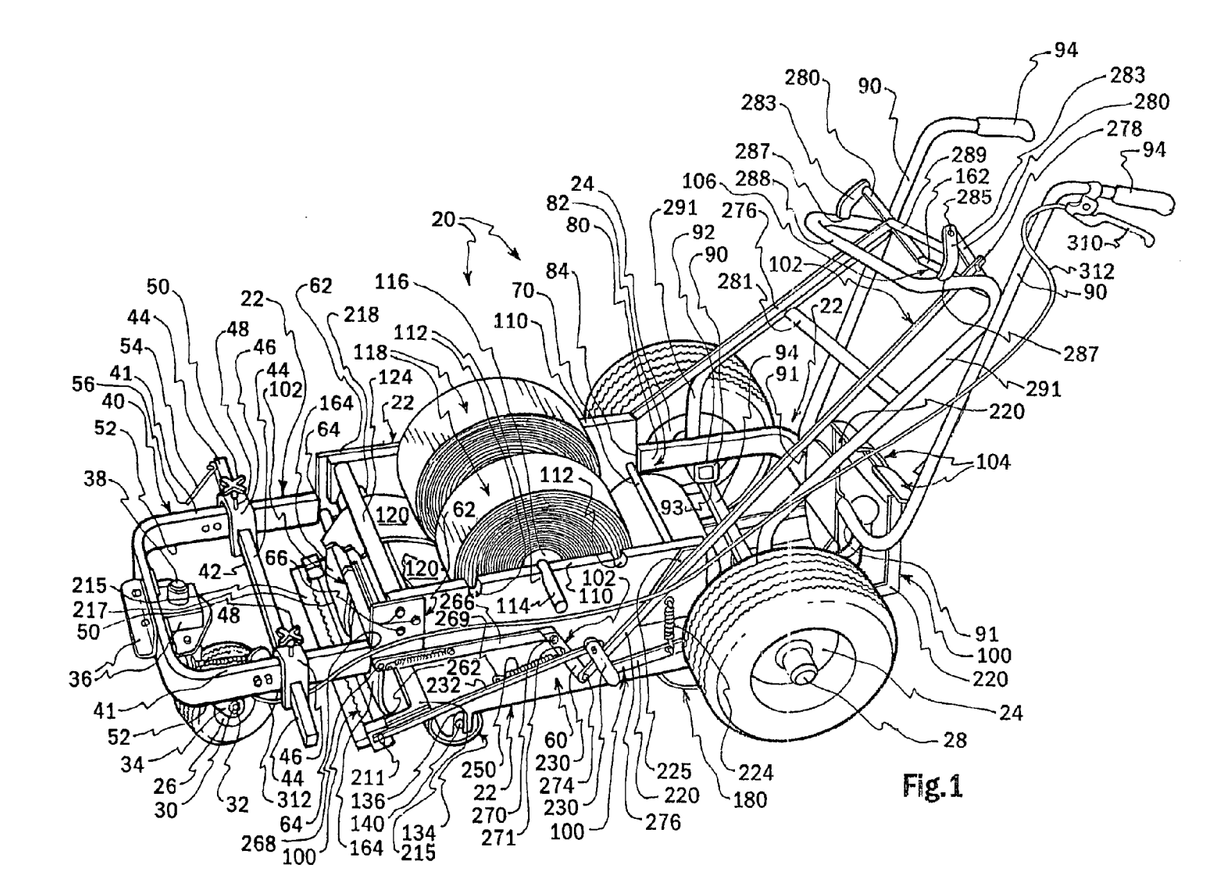
FIG. 1 is a perspective of a presently preferred tape-applying striper in accordance with the principles of the present invention.

Reference is now made to the drawings wherein like numerals are used to designate like parts throughout. FIG. 1 illustrates a presently preferred tape-applying striper, generally designated 20. The striper 20 comprises a rigid carriage, generally designated 22. The carriage is mounted upon three idler wheels, i.e. two opposed larger diameter tire-carrying rear wheels 24 and one front tire-carrying wheel 26. Idler rear wheels 24 are rotatably mounted upon right and left axles 28 in a conventional way, each of the two axles 28 being rigidly secured to the carriage 22 so the axles 28 are stationary and the wheels 24 rotate in a fixed pattern on the axles 28. Thus, wheels 24 are not per se dirigible, although they trail the front steering caster wheel 26, as explained herein in greater detail. The steering caster wheel 26 is rotatably mounted upon an axle 30, secured by a nut 32 on each side. The axle 30 is connected to a caster bracket 34 in a conventional way, the bracket 34 being pivotably joined to the carriage 22 at mounting mechanism 36. Specifically, the caster bracket 34 is pivotably supported at pin 38, where selective rotation is available, as explained hereinafter in greater detail. The caster wheel 26 and caster bracket 34 are controlled by the operator so as to accommodate either a fixed linear rotation or a curvilinear rotation, as explained in greater detail herein.

The carriage 22 comprises a U-shaped front frame member generally designated 40, preferably having a hollow rectangular cross section and being formed of steel, although other shapes and materials could be used. The U-shaped front frame 40 carries a pointer mechanism, generally designated 42, by which the striper follows a conventional offset string line, as the striper applies one or two lengths of tape to the pavement, as explained herein in greater detail. The pointer mechanism 42 comprises an adjustable cross bar 44, which passes under the front frame 40 and through slots in right and left adjustable inverted U-shaped couplers 46. The couplers 46 are formed of steel. Each coupler 46 threadedly receives, through a threaded aperature, a set screw 48 manually turned by an exposed handle 50. When the set screws 48 are tightened against the top surface 41 of the frame 40, the brackets 46 pull the crossbar 44 up into firm non-displaceable relation with the lower surface 52 of the front frame 40. Thus, the pointer crossbar 44 is held in a fixed position. When the set screws 48 are loosened, the crossbar 44 may be displaced transverse to the axis of the striper 20 to adjust the bar location and, accordingly adjust the pointer 54 to accommodate use of the pointer 54 to follow the string line. Conventionally, the string line is positioned in offset relation, at a known distance, from the location where tape is to be applied to the pavement by striper 20.

For minor adjustments, the pointer 54 is pivotably mounted at its upper end 50 to one end of the cross bar 44 so that the tip 56 of the pointer 54 can be rotated to adjust the position of tip 56 is directly over the string line.

The carriage 20 further comprises two centrally located spaced steel plates 60. The rearwardly directed ends of the front frame 40 are respectively welded to spaced gusset plates 62, at sites 64. Plates 62 are in turn bolted, respectively, at sites 66, to a forward portion of the associated plate 60. Thus, the front frame 40 is rigidly and non-rotatably connected to both spaced side plates 60.

The spaced side plates 60 are secured one to another and held in the desired rigid positions in spaced vertical planes by a plurality of cross support bars 70. Cross supports bars 70 are secured rigidly to both plates 60 by welding or use of conventional fasteners. Any suitable number of cross support bars 70 may be used to provide structural rigidity and ample support.

The carriage 22 further comprises a rear U-shaped frame, generally designated 80, which is substantially similar to the front frame 40, though of reverse orientation. Thus, the rear frame 80 is preferably formed of steel and is of hollow rectangular cross section. The rear frame 80 is rigidly fastened to both side plates 60 at the free ends 82 of the rear frame 80, at weld sites 84. Thus, the plates 60 and the rear frame 80 are rigidly integrated.

The axle 28 for each wheel 24 is rigidly non-rotatably carried within the hollow of an associated axle housing 90. The wheels 24 turn rotatably upon their associated axle 28. The axle housings 90 are welded at sites 92 to the lower surface of the rear frame 80 and are superimposed in welded relation at sites 93 upon cross bar 94. Cross bar 94 thus rigidly supports both axle housings 90.

Upwardly-directed rear handle bars 90 are rigidly welded to the rear frame 80 at sites 91. The handle bars 90 are gripped by the operator at covered ends 94 for manual control.

The carriage 22 supports both a cutting mechanism, generally designated 100, and a tape end displacement mechanism, generally designated 102. The cutting mechanism 100 is operator-controlled, using one or both pedals 104, as hereinafter explained in detail. The tape end displacing mechanism 102 is operator-controlled, using the displacable handle 106, as explained in greater detail hereinafter.

Along the top edge 110 of each side plate 60 is disposed three open rounded slots 112. The sets of slots in the two plates 60 are aligned in pairs so as to be in perpendicular alignment in respect to the longitudinal axis of the striper 20. The rounded slots 112 accommodate rotatable gravity insertion of and support for a tape shaft 114, which is non-rotatably connected to a tape spool 116. While one roll of tape 118 may be placed on the spool 116, FIG. 1 illustrates placement of two spaced rolls of tape 118. The two rolls tape 118 accommodate facile placement of spaced lengths of tape in parallel relation on pavement, which often is mandated by the controlling specification. Even though two rolls 118 of tape are illustrated, it is to be appreciated that tape displacement may be from one or two rolls, under control of the operator.

The tape may be any suitable commercially available tape, which comes in four, six, eight, twelve and twenty four inch widths. For example, one suitable tape is the high performance tape identified by the notation STAMARK, manufactured by Minnesotta Mining and Manufacturing, Inc. (3M).

Figure 5:
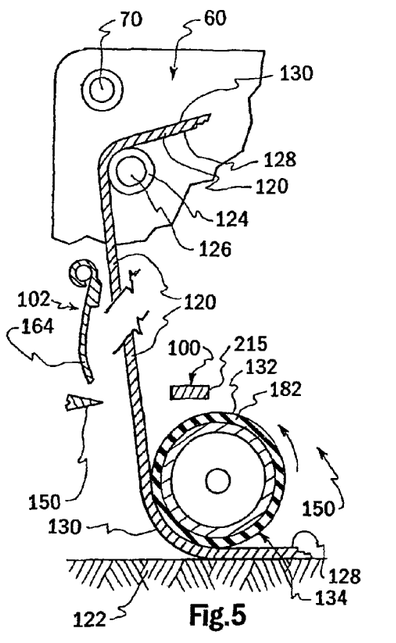
FIG. 5 is a diagrammatic representation of the path traversed by marking tape from a roll carried by the striper of FIG. 1 along a tape displacement path into adhering relation with the pavement.

One or both of the tapes 120 from tape rolls 118 are fed, from spool 116, as spool shaft 114 turns, through the tape path illustrated in FIG. 5 into initial and subsequent accurate adherence with the pavement 122. Thus, the tape is contiguously displaced around idler roller 124, as roller 124 turns. During continuous tape placement, tape adherence to the pavement and striper displacement unrolls tape from the spool 116. Tape feed idler roller 124 is supported for rotation upon a stationary cross shaft 126 (FIG. 5). Cross shaft 126 is fixed at its ends to both spaced plates 60. Thus, the roller 124 rotatably turns on the stationary shaft 126. The tape 120, as is conventional, comprises one high-wear non-adhesive surface 128, which surface contiguously and non-adhesively engages the roller 124. The tape 120 also comprises a second adhesive surface 130. Surface 130 has significant adhesive characteristics. The tape 120, in its displacement path, extends, from roller 124 downwardly and rearwardly past a portion of the tape end displacement mechanism 102, through the cutting mechanism 100 and around the outer surface 132 of a compression roller, generally designated 134. See FIG. 5.

Figure 7:
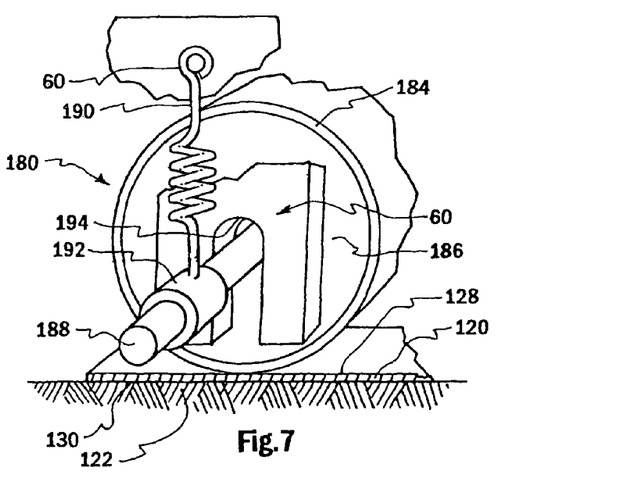
FIG. 7 is a fragmentary perspective showing one of two pressure-applying rollers forming a part of the striper in FIG. 1.

Roller 134 applies substantial pressure to the non-adhesive top surface 128 of the tape, as the tape contiguously engages the pavement 122 at its bottom adhesive surface 130 during striper displacement. During tape displacement from one or both tape rolls 118 onto the pavement 122, as depicted in FIG. 5, only the non-adhesive surface 128 of the tape 120 contacts the outer surface of idler roller 124 and the outer surface 132 of pressure roller 134. The pressure-applying roller 134 is rotatably supported at its two ends by the space plates 60, in U-shaped slots 136 (FIG. 1), to accommodate limited up and down movement. A pair of springs similar to the one depicted in FIG. 7, exert on the roller shaft 140 a downward force to enhance initial adherence of the adhesive side 130 of the tape 120 to the pavement 122, while allowing limited up and down movement of the roller 134.

Sometimes the tape 120 applied to the pavement along a predetermined location is continuous and sometimes segments of the tape are spaced, requiring that the tape be cut. Furthermore, sometimes parallel lengths of tape 120 are applied continuously to the pavement and sometimes one length of tape is continuous, while the other is cut into segments and sometimes both lengths of tape require cutting into segments.

When the cutting mechanism 100 is activated by operator displacement of one or both pedals 104, a cutting blade 150 is displaced against cutting bar 215 (FIGS. 3 and 5) to sever one or both tapes at a desired location. This causes one or both lengths of tape 120 to be severed transversely, creating a free tape end 160 (FIG. 6), which is located above the pavement 122.

Figure 6:
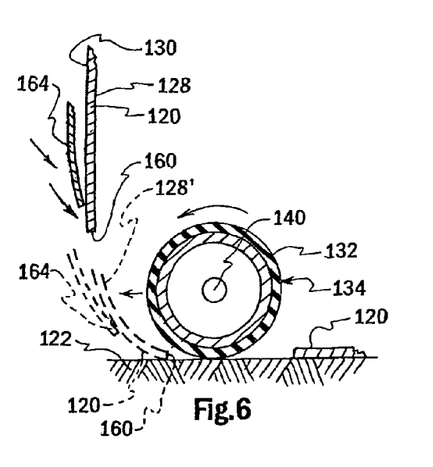
FIG. 6 is a diagrammatic representation of the manner in which the mechanism of FIG. 4 displaces a free end of the tape from a location above the pavement into contiguous adhering relation with the pavement.

To return the free cut end or ends of tape or tapes 120 to a contiguous adhering relation with the pavement 122, the operator displacing control handle 162 of the tape displacing mechanism 106, located near the handles 94, thereby displaced two spaced fingers or paddles 164 causing the back surface of the two paddles to engage the adhesive side 130 of the tape 120 so as to create limited or nominal adherence and to thus displace the free end 160 of the tape or tapes rearwardly and downwardly, as depicted in solid and dotted lines in FIG. 6, such that the adhesive side 130 at the free end of the tape is caused to once more adhere to the pavement at a predetermined accurate location. Thereafter, the roller 134, at surface 132, again becomes superimposed upon and applies pressure to the non-adhesive side 120 of the tape, first at the free end 160 and, thereafter, along the length of the tape, as the striper 20 moves and the tape is progressively and contiguously applied to the pavement 122 during striper displacement. The exact way in which operator displacement of the actuator 162 causes the paddles or fingers 164 to move, as described above, will be set forth in greater detail hereinafter.

The carriage 20 supports a second traverse roller for applying even a greater force or pressure to the non-adhesive surface 128 of the pavement-engaging tape 120, specifically larger compression roller, generally designated 180. See FIGS. 1 and 7. Just as roller 134 comprises an elastomeric layer 182 at the outside thereof, so too does roller 180 have an outside annular layer 184 formed of elastomeric durable material. The interior of the pressure roller 180 comprises a steel cylinder 186, which may be filled with high density particles to increase its weight and the pressure applied to the tape, in the manner shown in FIG. 7.

In addition to or in lieu of high density material within the cylinder 186, each end of the roller 180, comprising fixed cylindrical shafts 188 may be biased, by a suitable compression spring 190, shown to be rigidly attached at its lower end to a collar 192. The collar 192 is rotatably mounted to the shaft 188. The spring 190, at its upper end is rigidly attached to plate 60. Pressure-applying roller 180 is an idler roller and is shown, in FIG. 7, as being mounted to associated plate 60, with each shaft 188 passing through a U-shaped slot 194, to permit limited up and down movement of the shaft 188 and roller 180. The roller 180, by applying pressure to the non-adhesive side 128 of the tape 120, significantly increases the strength of adherence between the adhesive side 130 of the tape 120 and the pavement 122.

Figure 2:
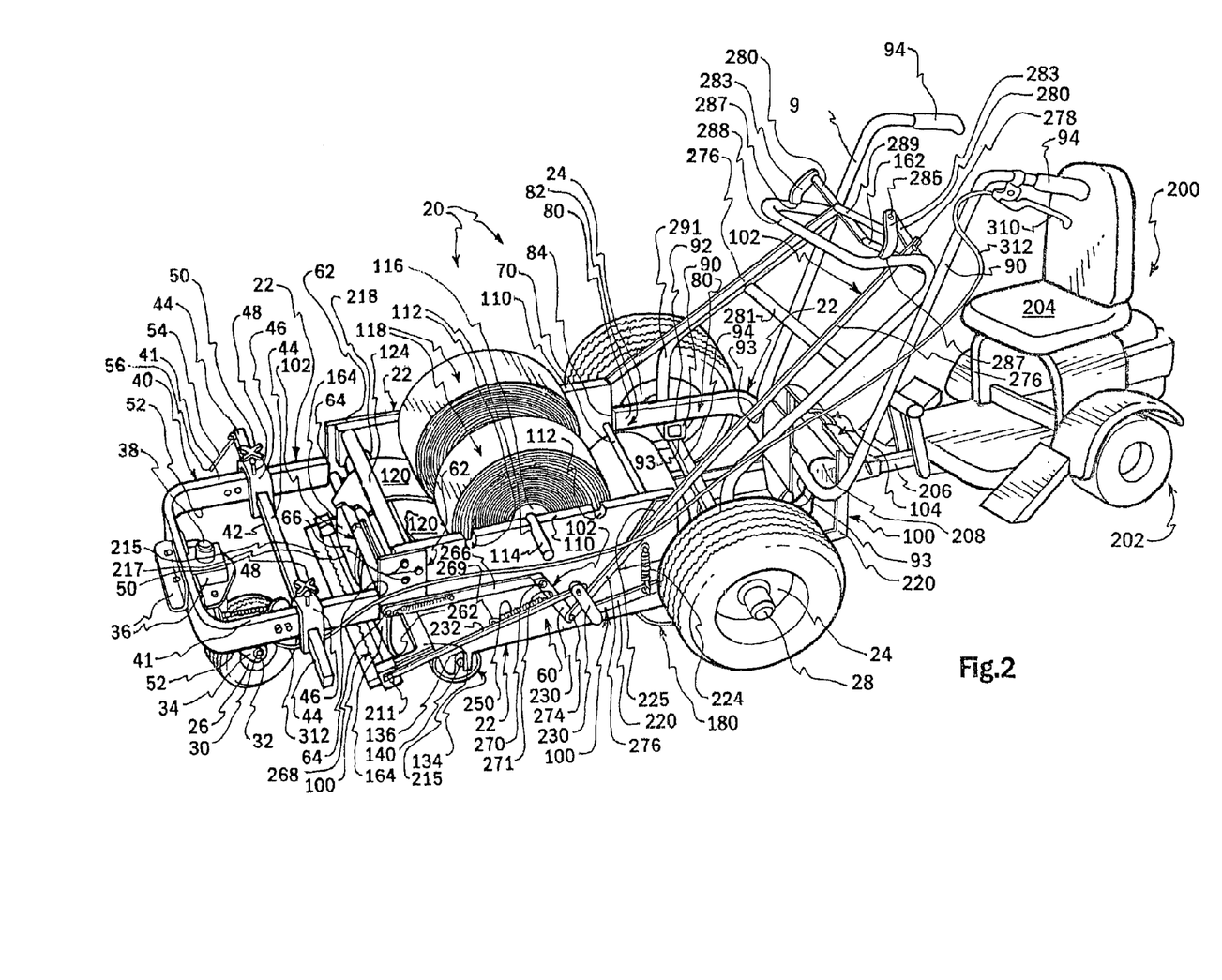
FIG. 2 is a fragmentary perspective illustrating the trailing end of the striper rotatably connected to a motorized vehicle, by which the striper is displaced to apply marking tape to pavement.

Except for local areas where manual displacement of the striper 20 is necessary, the striper 20 is driven by a motorized operator controlled vehicle 200 of commercially-available type. FIG. 2. Vehicle 200 comprises, under control of the operator, an engine, a drive train for forward and rearward displacement, a braking system and a pivotal connection to the rear of the striper 20, shown best in FIG. 2. The striper 20 comprises a rearwardly extending tongue, upon which a ball connector hitch is rigidly mounted.

The vehicle 200 comprises two spaced motor-driven wheels 202, a seat 204, upon which an operator sits. The operator controls both the vehicle 200 and the striper 20. Rigidly mounted to the vehicle 200 is a front tongue 206 upon which a socket hitch 208 is carried at the forward end thereof. The socket 208 fits over the connecting ball at the trailing end of the striper 20 and is releasibly locked in the connected position by a standard hitch clamp. When the vehicle 200 is so connected to the striper 20, as illustrated in FIG. 2, the motorized vehicle 200, with the operator seated upon seat 204, will displace and the operator will control accurately the displacement of the striper 20 so that lengths of tape 120 are adheringly superimposed and compressed upon the pavement precisely in the desired locations, as set forth in the roadway specification. The vehicle-caused displacement of the striper 20 may be linear or curvilinear, depending upon whether the front wheel 26 is locked or unlocked. The vehicle is able to displace the striper 20 at speeds up to 15 miles per hour, while tape placement is secure and precise, a rate greatly in excess of the speed at which prior tape-applying stripers have been operated. Since the vehicle 200 is commercially available, no further description is necessary for one skilled in the art to understand its modes of operation.

Figure 3:
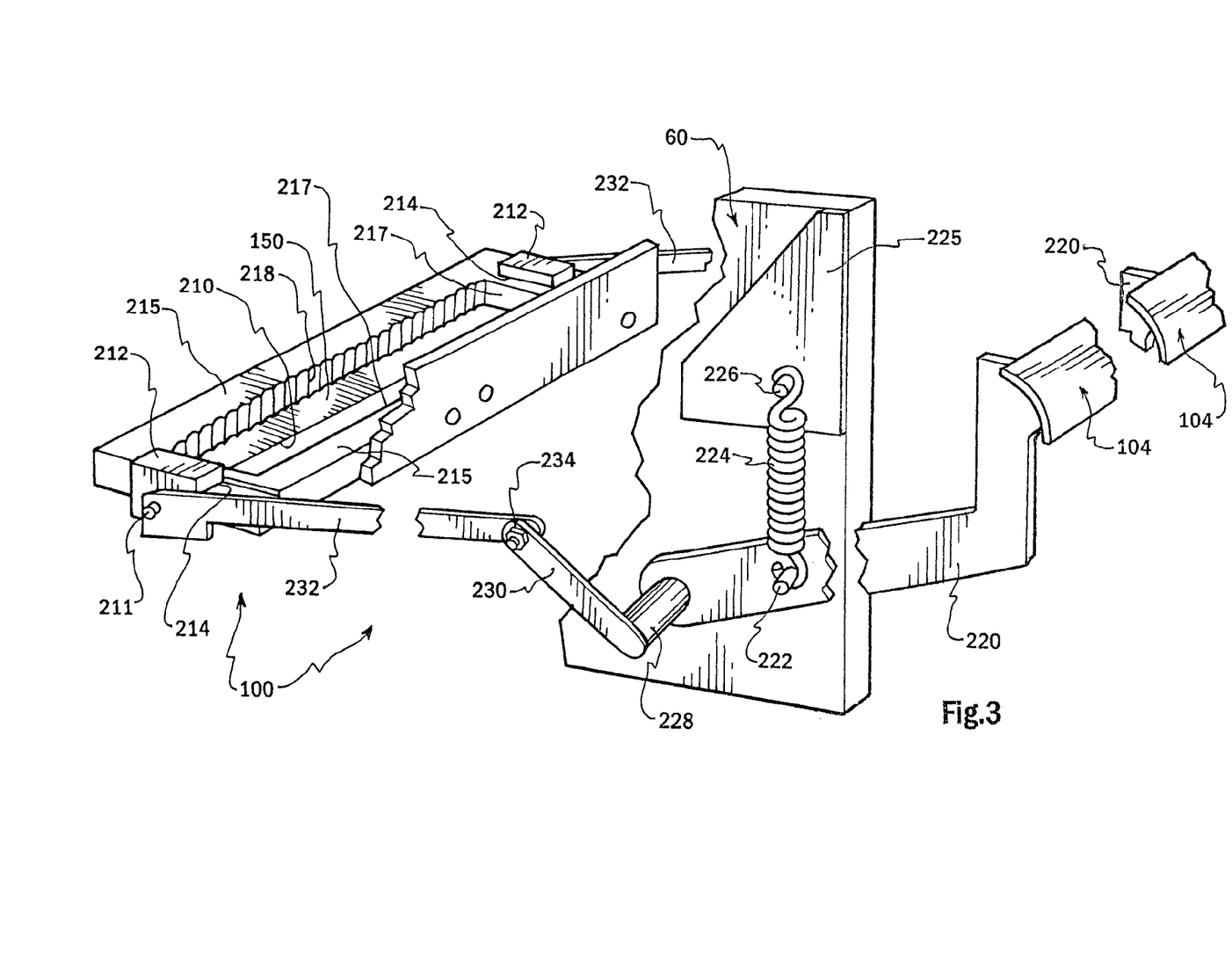
FIG. 3 is an enlarged fragmentary perspective of the tape-cutting mechanism forming a part of the striper of FIG. 1.

In reference to FIG. 3, the tape-cutting mechanism 100 comprises a reciprocable cutting blade 150, which has a sharp cutting edge 218 extending toward the rear. The blade 150, at each end thereof, is connected to a reciprocable slider block 212. Each slider block 212 comprises a slot 214 accommodating front to rear sliding displacement of the blocks 212 along the top surface of a cutting bar 215, which is rectangular in shape and comprises a central slot or opening 217. The forward part of cutting bar 215 comprises an undulating or serrated surface 218, which prevents any substantial adherence between the serrated surface 218 and the adhesive side 128 of tape 120 passing through the slot 217.

Figure 8:
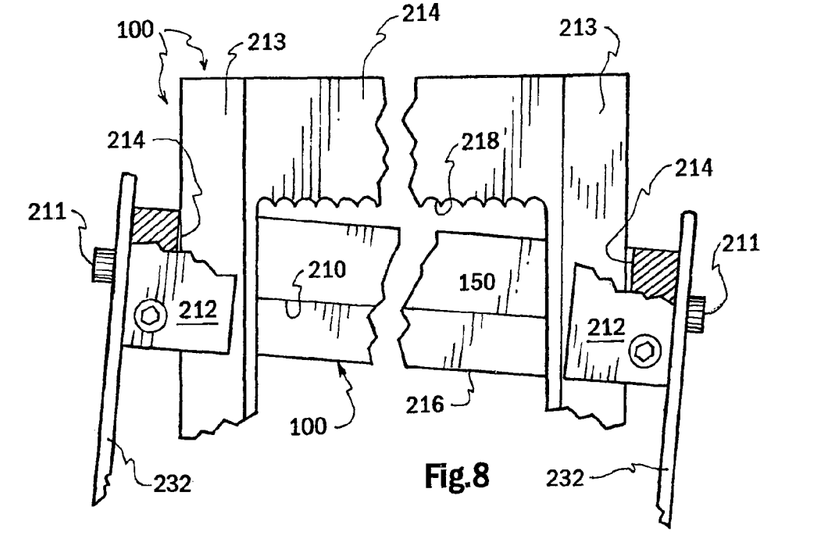
FIG. 8 is a top view of the tape cutting mechanism, including the displaceable blade by which one or both lengths of tape are accurately cut into segments.

When both pedals 104 are simultaneously depressed by the operator, both blocks 212 move in unison toward the rear at the same rate of speed, causing both tapes 120, disposed in slot 217, to be cut by cutting blade 150. When only one length of tape is extending through the slot 217, the pedal on the side where the tape is most closely associated is activated, causing the blade 150 to move in a rearward direction with a pivotal action around the non-activated block 212, so that only one tape is cut on the side where the pedal is activated and a second tape extending through slot 217 remote from the tape being cut is not cut. See FIG. 8. When the pedal on the other side is solely activated, the corresponding block 212 is advanced and rotated while the other block 212 accommodates the rotation while otherwise remaining essentially stationary. This allows the tape adjacent to the displaced block 212 to be cut, while the second tape extending through slot 217 is not cut.

In respect to FIG. 3, the linkage attached to each pedal 104 is identical so only one needs to be described. The linkage 100 comprises an L-shaped member 220 rigidly connected to the associated pedal 104. The L-shaped link 220 is spring biased upwardly by spring 224, which is connected at one end to stud or pin 222. Pin 222 is rigidly connected to the L-shaped member 220 somewhat off center. The upper end of spring 224 is connected to stud or pin 226, which is rigidly anchored to the adjacent plate 60, at reinforcing gusset plate 225. Thus, the link 220 is displaced, counter to the bias of spring 224, when the associated pedal 104 is depressed and returns to the position of FIG. 3 when the depressed pedal 104 is released by the operator. Link 220 at its forward end is connected to sleeve 228. Sleeve 228 connects to an adjacent end of link 230. Link 230 is pivotally connected at site 234 to link 232. Link 232 is rotatably connected at pin 211, which is rigidly attached to associated block 212. This accommodates reciprocation of the block 212 between the at rest position of the blade 150 and the cutting position of the blade 150, when the associated pedal 104 is depressed.

Since the linkage 100 for the cutting system biases the cutting blade 150 into its non-cutting position, as illustrated in FIGS. 1 and 3, release of the activated pedal 104 will cause the return springs 224 to re-position the cutting-blade in the inactive location, shown in FIG. 3. Accordingly, when one or both pedals 104 are depressed by the operator, the cutting motion of the blade 150 is counter to the forces exerted by both return springs 224.

Figure 4:
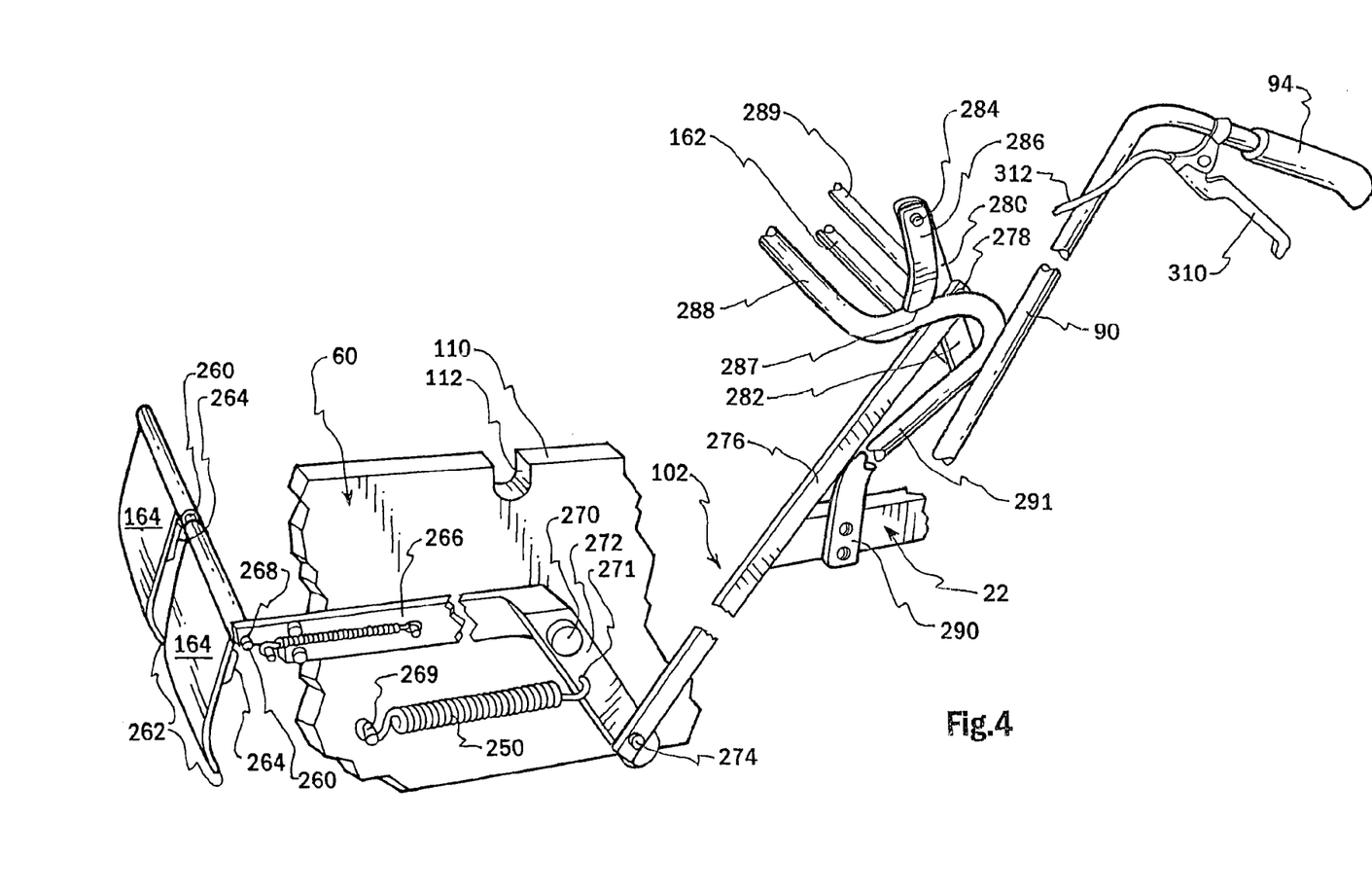
FIG. 4 is a fragmentary perspective illustrating the mechanism for displacing a free end of marking tape from above the pavement generally downwardly into contiguous adhering relation with the pavement.

With reference to FIG. 4, the tape end feeding system, comprising paddles 164, is spring biased into the inactive position by spring 250 so that manual activation of the activating crossbar 162 will cause the paddles to displace the free end of one or both tapes 120 from above the pavement into adhering relation with the pavement, as explained above in conjunction with FIGS. 5 and 6. When the pivotable actuating arm 162 is released by the operator, the associated linkage 102 returns the paddles 164 to their inactive at rest position shown in FIGS. 1 and 5.

More specifically, in respect to FIG. 4, the two paddles 164, which are formed of steel and are non-rotatably mounted on a rod 260 are in the inactive position when bar 162 is not depressed. In this position, the curved tips 262 of the paddles 164 are spaced away from the adhesive side 130 of the tape 120. As shown in FIG. 5, the interior top portion of both flaps 164 comprises serrations 264, which substantially limit any contact between the flaps 164 and the adhesive side 130 of the tape 120, with the exception of limited tape contact with the tips 262. The linkage 102 between the paddles 164 and the actuator 162, which is preferably formed of steel, comprises an angular link 266 rotatably connected at pin site 268 to the pin 260. Link 266 is also pin connected at 270 to the adjacent plate 60, accommodating rotation of the link 266 in a counterclockwise direction when the actuator 162 is depressed by the operator. This causes the paddles 164 to move, as described in conjunction with FIG. 6. The motion in question is counter to the bias of return spring 250. The trailing arm 272 of the link 266 is rotatably connected at pin 274 to a diagonal link 276. Link 276, at its upper end, is pin connected, at 278, to bar 280, which, in turn, is rigidly connected, at site 282, to crossbar actuator 162.

Thus, when the crossbar actuator 162 is pushed downwardly, the angular link 266 is rotated, thereby displacing the paddles 164 in the manner explained in conjunction with FIG. 6.

The upper end of bar 280 is pin connected at 284 to a stationary support frame comprising members 286 and 288. The lower end of member 286 of the stationary frame is rigidly secured to frame member 288 at weld location 287, while the lower end 190 of member 291, an extension of member 288, is rigidly fastened to frame member 22.

Figure 9:
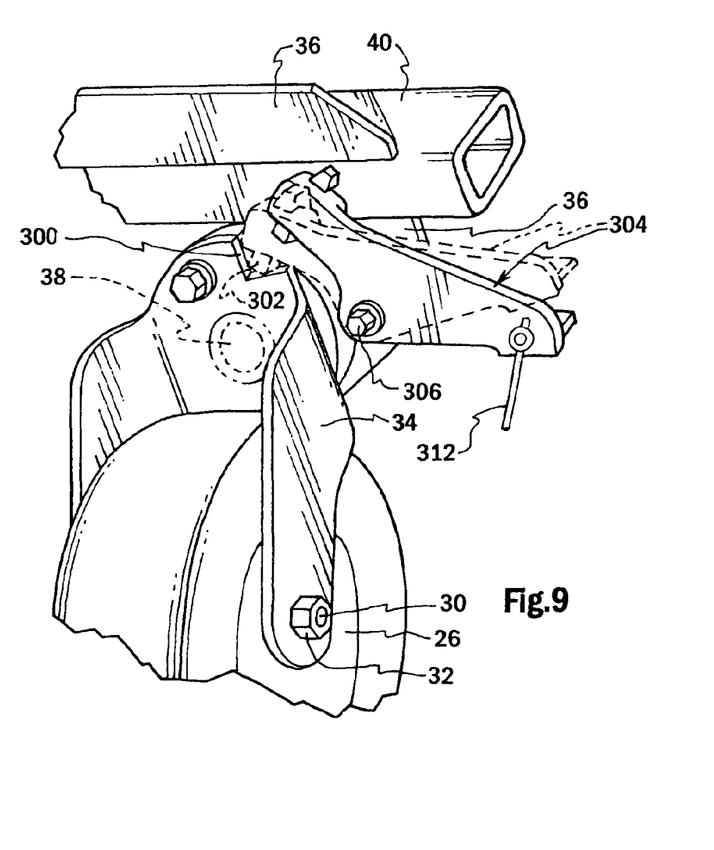
FIG. 9 is a bottom view of the front wheel, the front wheel caster frame and a releasable latch mechanism, by which the front wheel is caused to follow a linear path or accommodate displacement along a curvilinear path.

Reference is now made to FIG. 9, which illustrates a latch mechanism for the front wheel 26, i.e. at the top of caster frame 34. Caster frame 34 comprises a notch 300 into which a retainer 302 of latch 304 selectively extend, when the latch to secure the wheel 26 and caster frame 34 in a fixed position to accommodate lineal displacement during intervals of time when tape is being placed on the pavement in a straight line. The latch 304 is pivotably supported by the caster frame, at pin 306, accommodating pivotal rotation of the latch 304 between the closed dotted line position, shown in FIG. 9, and the open solid line position, shown also in FIG. 9. In the absence of other forces, a spring may be associated with the latch 304 to bias the latch toward the dotted line position of FIG. 9. However, when the rotatable handle 310 (FIGS. 1 and 4), is squeezed toward the adjacent handle grip 94, cable 312 retracts the latch 304 from the dotted to the solid line position of FIG. 9, counter to the spring bias, allowing the caster frame 34 and the wheel 26 to rotate. In this way, the striper 20 may be turned in a curvilinear path to deposit tape onto the pavement in a curvilinear, accurate pattern.

The invention may be embodied in other specific forms without departing from the spirit of the essential characteristics thereof. The present embodiments, therefore, are to be considered in all respects as illustrative and not restrictive, the scope of the invention being indicated by the appended claims rather than by the foregoing description, and all changes which come within the meaning and range of equivalency of the claims are therefore intended to be embraced therein. What is claimed and described to be secured by Letters Patent is:

The invention claimed is:

1. A striper for applying marking tape to pavement at desired locations comprising:
    a carriage comprising a front and a rear, the carriage being mounted on pavement-engaging wheels;
    the carriage rotatably supporting at least one spool, the at the least one spool being mounted rotatably on an idler axle adapted to rotatably dispense the tape along a predetermined path onto the pavement, the tape having a non-adhesive side and an adhesive side;
    the path comprising only two sites which contiguously engage only the non-adhesive side of the tape to redirect the tape so that during continuous pavement placement of the tape there is no contact with the adhesive side of the tape;
    the first redirection site comprising an idler roller at an elevation substantially above the pavement and in front of the at least one spool by which the tape is redirected into a generally downward direction;
    the second redirection site comprising an idler pressure roller generally below the idler roller by which the tape is redirected into pressurized contiguous relation with the pavement;
    a tape cutting mechanism carried by the carriage and located adjacent to the tape between the idler roller and idler pressure roller by which an operator selectively causes the tape to be cut leaving a free end of the tape suspended in air;
    a tape end displacement mechanism which is selectively activated under operator control to cause one limited edge area only of at least one displaceable finger, without compression, to first move toward the tape to thereby engage in a slight way the adhesive side of the tape above the free end thereof and thereafter to displace the free end of the tape in spaced relation past the tape cutting mechanism bringing the adhesive side of the tape adjacent to the free end thereof into contiguous adhering engagement with the pavement in front of the idler pressure roller, solely by reason of the limited area engagement, the tape end displacement mechanism being deactivated under operator control to displace the finger away from the tape to thereby eliminate the limited area engagement without disrupting the adhering engagement between the adhesive side of the tape at the free end thereof and the pavement.

2. A striper according to claim 1 wherein the tape displacing mechanism comprises a manual control carried by the carriage at the rear thereof and mechanical linkage spanning from the rear to the front of the carriage, the linkage being connected to at least one finger for moving the finger rearwardly and downwardly.

3. A striper according to claim 1 wherein the idler axis rests by force of gravity in spaced open grooves of the carriage.

4. A striper according to claim 1 further comprising a motorized vehicle pivotably attached to the rear of the carriage for jointly displacing the vehicle and the carriage at speeds up to 15 miles per hour.

5. A striper for applying marking tape to pavement at desired locations comprising:
    a carriage comprising a front and a rear mounted on pavement-engaging wheels;
    the carriage rotatably supporting at least one spool adapted to rotatably dispense the tape along a predetermined path onto the pavement, the tape having a non-adhesive side and an adhesive side;
    the path comprising sites which contiguously engage only the non-adhesive side of the tape so that there is no contact with the adhesive side of the tape, each site redirecting the tape;
    a tape cutting mechanism carried by the carriage and comprising a tape cutter located adjacent to the tape at the front of the carriage, cutter linkage connected to the cutter at the front and extending to the rear of the carriage and at least one manual control connected to the cutter linkage at the rear and exposed for selective facile use by an operator to create a free tape end suspended in the air;
    a tape displacement mechanism comprising an adhesive side line engagement element at the front and adjacent to the cutter, the tape displacement mechanism further comprising element displacing linkage and at least one manual element control at the rear of the carriage for facile selective displacement of the element into releasable line contact only with the adhesive side of the tape adjacent to the free end of the tape and thence downward by until the adhesive side of the tape at the free end adheres to the pavement with the element disposed above the pavement;
    a motorized vehicle pivotably attached to the rear of the carriage for joint displacement of the vehicle and the carriage at speeds up to 15 miles per hour, the vehicle comprising a forward facing seat for the operator positioned so that limbs of the operator facilely accommodate selective manual activation of the cutter control and the tape displacement element control while seated.

6. A striper according to claim 5, wherein the at least one tape comprises two tapes and the cutter control comprises two foot pedals, whereby operator foot actuation of one pedal causes the cutter to cut one tape, operator foot actuation of the other pedal causes the cutter to cut the other tape and the operator foot actuation of both pedals causes the cutter to simultaneously cut both tapes.

7. A striper according to claim 5 wherein the element control comprises a hand manipulatable grasping structure selectively actuatable by the operator after the tape is cut.

8. A tape-applying striper comprising a carriage supported by two rear wheels and a selectively dirigible front wheel;
   a manual latch carried at the front wheel having a first operator set non-dirigible position which is set directly at the front wheel and only permits displacement of the front wheel and the carriage along a linear path and a second operator set dirigible position which is set directly at the front wheel and accommodates displacement of the front wheel and the carriage along a non-linear path a tape displacement mechanism, operable to position a free end of the at least one tape into engagement with a surface being striped.

9. A method of applying marking tape to pavement comprising the acts of:
   placing at least one roll of marking tape on a wheel-mounted displaceable carriage, the tape comprising an adhesive side and a non-adhesive side;
   unwinding the tape along a carriage-defined path so that, during continuous tape placement on the pavement, the carriage and the adhesive side of the tape are not contiguous;
   operator actuating a tape cutter at the front of the carriage to cut the tape at a location above the ground creating two free tape ends, one end being suspended in the air;
   operator actuating a tape end displacement element into constrained temporary contact with the adhesive side of the tape only adjacent to the suspended free end and to lower the free end into permanent pavement engagement spaced from the other cut end;
   and thereafter moving the displacement element out of contact with the adhesive side of the tape.

10. A method according to claim 9 further comprising the acts of:
    pivotably attaching the carriage to the front of a motorized vehicle for joint displacement of the vehicle and the carriage;
    positioning the operator upon a vehicle seat for facile use of controls at the rear of the carriage by which the operator actuating acts are implemented.

11. In combination, a striper for applying marking tape to pavement and a motorized vehicle, upon which an operator is seated, for displacing the striper at rapid speeds while applying the tape, the combination comprising:
    a releasibly pivotable connection between a rear location of the striper and a front location of the motorized vehicle;
    the striper comprising a wheeled carriage comprising further one front wheel and at least two rear wheels, a front tape cutter, a front displacement structure for temporarily engaging an adhesive side of a cut free end of the tape and thereby displacing the cut free end of the tape into adhesively retained engagement with the pavement, a front wheel latching/unlatching mechanism respectively accommodating linear and selective non-linear striper displacement, and manual steering handles disposed at a elevated rear location;
    manual controls carried at the rear of the striper which are linked respectively to the cutter, the front displacement structure, and the latching/unlatching mechanism, the manual controls comprising two foot pedals by which the operator manually controls the cutter, at least one a hand control by which the operator manually controls the front displacement structure and a hand control by which the latching/unlatching mechanism is manually controlled by the operator;
    the motorized vehicle comprising a seat upon which the operator sits, whereby, the operator having facile manual access to the manual controls carried at the rear of the striper by the operator.

12. The combination of claim 11 wherein the motorized vehicle is without independent steering.

13. A method of using a tape marking striper and a trailing motorized vehicle comprising one front wheel and at least two rear wheels to place marking tape on pavement, comprising the acts of:
    pivotably connecting a front of the motorized vehicle to a rear of the striper;
    propelling the striper by the rear motorized vehicle along a predetermined pavement path;
    selectively manually actuating, by an operator sitting on the motorized vehicle, a front tape cutter carried by the striper to create two free tape ends, with one free end suspended above the pavement;
    selectively manually actuating, by the operator sitting on the motorized vehicle, a tape displacement mechanism to only slightly engage an adhesive side of the tape adjacent to the free end and displace the free end downwardly into adhesive adherence with the pavement at a desired location;
    selectively manually actuating, by the operator sitting on the motorized vehicle, a front wheel latching/unlatching mechanism for linear and non-linear displacement of the striper, respectively; and
    steering the striper and the motorized vehicle by the operator sitting on the motorized vehicle only by steering handles disposed at the rear of the striper.

* * * * *